United States Patent
Yan

(10) Patent No.: US 11,368,982 B2
(45) Date of Patent: Jun. 21, 2022

(54) MOBILE PHONE NETWORK RANDOM ACCESS

(71) Applicant: Motorola Mobility LLC, Chicago, IL (US)

(72) Inventor: Zhi Yan, Beijing (CN)

(73) Assignee: Motorola Mobility LLC, Chicago, IL (US)

( * ) Notice: Subject to any disclaimer, the term of this patent is extended or adjusted under 35 U.S.C. 154(b) by 0 days.

(21) Appl. No.: 16/468,246

(22) PCT Filed: Dec. 9, 2016

(86) PCT No.: PCT/CN2016/109105
§ 371 (c)(1),
(2) Date: Jun. 10, 2019

(87) PCT Pub. No.: WO2018/103054
PCT Pub. Date: Jun. 14, 2018

(65) Prior Publication Data
US 2019/0335509 A1 Oct. 31, 2019

(51) Int. Cl.
*H04W 74/08* (2009.01)
*H04W 76/30* (2018.01)
(Continued)

(52) U.S. Cl.
CPC ..... *H04W 74/0833* (2013.01); *H04W 72/042* (2013.01); *H04W 76/10* (2018.02); *H04W 76/30* (2018.02)

(58) Field of Classification Search
CPC .......... H04W 74/0833; H04W 72/042; H04W 76/10; H04W 76/30; H04W 72/12;
(Continued)

(56) References Cited

U.S. PATENT DOCUMENTS

| | | | |
|---|---|---|---|
| 2012/0076085 A1* | 3/2012 | Chou | H04W 68/00 370/329 |
| 2013/0015953 A1* | 1/2013 | Hsu | H04W 4/08 340/7.46 |

(Continued)

FOREIGN PATENT DOCUMENTS

| | | |
|---|---|---|
| CN | 102651853 A | 8/2012 |
| CN | 103796167 A | 5/2014 |

OTHER PUBLICATIONS

3GPP TSG RAN WG1 Meeting #87;R1-1611277 ; Source: ZTE, ZTE Microelectronics; Title: Considerations on Paging Transmission; Reno, USA Nov. 14-18, 2016 (Year: 2016).*
(Continued)

*Primary Examiner* — Hassan A Phillips
*Assistant Examiner* — Mohammed S Chowdhury
(74) *Attorney, Agent, or Firm* — Kunzler Bean & Adamson

(57) ABSTRACT

For mobile phone network random access, a method transmits a connection release message (200) to communication device (110). The connection release message (200) includes a transmission identifier (205) and the transmission identifier derives a paging frame (280) and a paging occasion for the communication device. The method further transmits a group paging (250) at the paging frame (280) and the paging occasion. The group paging includes a scrambling value (255) and a listening window duration (260). In addition, the method transmits scheduling information (296) via a Physical Downlink Control Channel (PDCCH) scrambled by the scrambling value (255).

12 Claims, 7 Drawing Sheets

(51) Int. Cl.
*H04W 76/10* (2018.01)
*H04W 72/04* (2009.01)

(58) Field of Classification Search
CPC ..... H04W 68/005; H04W 4/06; H04W 68/02; H04W 74/085
USPC ........................................................ 370/329
See application file for complete search history.

(56) References Cited

U.S. PATENT DOCUMENTS

| | | | |
|---|---|---|---|
| 2014/0179293 A1* | 6/2014 | Li | H04W 4/16 455/416 |
| 2015/0085805 A1* | 3/2015 | Li | H04W 72/044 370/329 |
| 2015/0103768 A1* | 4/2015 | Chen | H04W 72/1278 370/329 |
| 2016/0150507 A1* | 5/2016 | Kim | H04W 4/70 455/450 |
| 2016/0338006 A1 | 11/2016 | Lee et al. | |
| 2018/0184461 A1* | 6/2018 | Zhang | H04W 72/042 |
| 2018/0212736 A1* | 7/2018 | Chatterjee | H04L 5/0094 |
| 2018/0317198 A1* | 11/2018 | Lee | H04W 68/005 |

OTHER PUBLICATIONS

3GPP TSG RAN WG2 Meeting #70;R2-102781; Source: CATT ; Title: Paging and downlink transmission for MTC ; Montreal, Canada, May 10-14, 2010. (Year: 2010).*
3GPP TSG-RAN2 Meeting #70bis; R2-104004;Source: LG Electronics Inc.; Title: Group paging for MTC devices, Stockholm, Sweden, Jun. 28-Jul. 2, 2010 (Year: 2010).*
IEEE—Group-Based Signaling and Access Control for Cellular Machine-to-Machine Communication. Golnaz Farhadi and Akira Ito; Fujitsu Labs of America, Sunnyvale, CA, 94085, (Year: 2013).*
Patent Cooperation Treaty, "Notification of Transmittal of the International Search Report and the Written Opinion of the International Searching Authority, or the Declaration", PCT/CN2016/109105, dated Jul. 21, 2017, pp. 1-11.
Ki-Dong Lee et al., "Throughput comparison of random access methods for M2M service over LTE networks", 2011 IEEE GLOBECOM Workshops (GC Wkshps), Mar. 1, 2012, pp. 1-2.

* cited by examiner

MOBILE PHONE NETWORK RANDOM ACCESS

FIELD

The subject matter disclosed herein relates to random access and more particularly relates to mobile phone network random access.

BACKGROUND

A communication device may initiate a random access to establish communications with a base station in a mobile phone network.

BRIEF SUMMARY

A method for mobile phone network random access is disclosed. The method transmits a connection release message to communication device. The connection release message includes a transmission identifier. The transmission identifier derives a paging frame and a paging occasion for the communication device. The method further transmits a group paging at the paging frame and the paging occasion. The group paging includes a scrambling value and a listening window duration. In addition, the method transmits scheduling information via a Physical Downlink Control Channel (PDCCH) scrambled by the scrambling value. An apparatus also performs the functions of the method.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

Figure 1:
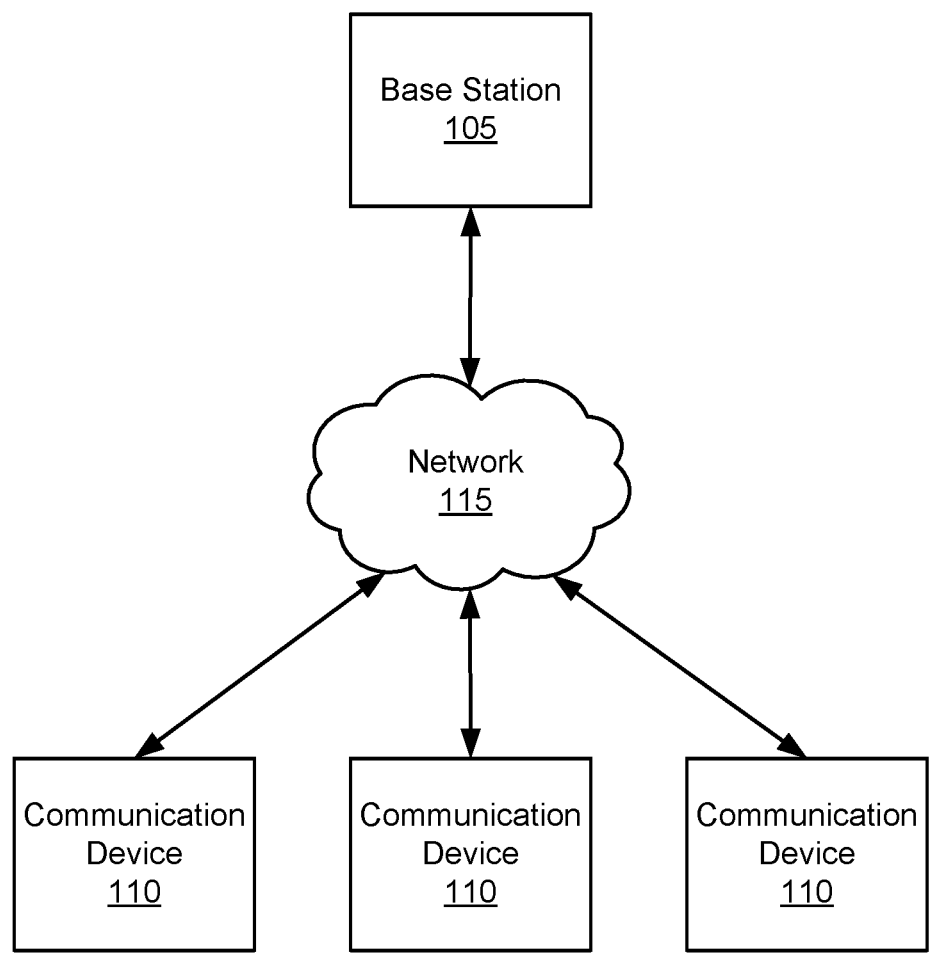
FIG. 1 is a schematic block diagram illustrating one embodiment of a mobile phone network system.

As will be appreciated by one skilled in the art, aspects of the embodiments may be embodied as a system, method or program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a program product embodied in one or more computer readable storage devices storing machine-readable code, computer readable code, and/or program code, referred hereafter as code. The storage devices may be tangible, non-transitory, and/or non-transmission. The storage devices may not embody signals. In a certain embodiment, the storage devices only employ signals for accessing code.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in code and/or software for execution by various types of processors. An identified module of code may, for instance, comprise one or more physical or logical blocks of executable code, which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different computer readable storage devices. Where a module or portions of a module are implemented in software, the software portions are stored on one or more computer readable storage devices.

Any combination of one or more computer readable medium may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Code for carrying out operations for embodiments may be written in any combination of one or more programming languages including an object oriented programming language such as Python, Ruby, Java, Smalltalk, C++, or the like, and conventional procedural programming languages, such as the "C" programming language, or the like, and/or machine languages such as assembly languages. The code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. These code may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The code may also be stored in a storage device that can direct a computer, other programmable data processing apparatus, or other devices to function in a particular manner, such that the instructions stored in the storage device produce an article of manufacture including instructions which implement the function/act specified in the schematic flowchart diagrams and/or schematic block diagrams block or blocks.

The code may also be loaded onto a computer, other programmable data processing apparatus, or other devices to cause a series of operational steps to be performed on the computer, other programmable apparatus or other devices to produce a computer implemented process such that the code which execute on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and program products according to various embodiments. In this regard, each block in the schematic flowchart diagrams and/or schematic block diagrams may represent a module, segment, or portion of code, which comprises one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

The description of elements in each figure may refer to elements of proceeding figures. Like numbers refer to like elements in all figures, including alternate embodiments of like elements.

FIG. 1 is a schematic block diagram illustrating one embodiment of a mobile phone network system 100. The system 100 includes a base station 105, a network 115, and a communication device 110. The base station 105 may communicate with the communication device 110 through the network 115. The base station 105 may be an evolved node B (eNB) Long Term Evolution (LTE) base station. The communication device 110 may be user equipment, another eNB LTE, a mobile phone, a machine-type communications (MTC) device, a tablet computer, a laptop computer, embedded communication devices in automobiles, kiosks, appliances, and the like. The network 115 may be a mobile phone network, a wide-area network, a wireless network, or combinations thereof.

The communication device 110 may establish communications with the base station 105 using a random access procedure. Unfortunately, occasionally many communication device instances 110 will attempt to establish communications with the base station 105 concurrently by communicating random access requests. However, the base station 105 may only be able to complete the random access procedure with a portion of the communication device instances 110. As a result, many of the communication device instances 110 are unable to establish communications with the base station 105 because of collisions among the random access requests. These communication device instances 110 may reinitiate the random access procedure, causing further collisions and slowing the establishment of communications for all of the communication device instances 110.

The difficulties in completing the random access procedure are exacerbated, as the base station 105 does not have any identity information for each of the communication device instances 110 until Radio Resource Control (RRC) connection request messages are received from the communication device instances 110. As a result, the base station 105 is unable to communicate individual instructions to the communication device instances 110.

The embodiments described herein communicate a transmission identifier from the base station 105 to the communication device 110. The embodiments further derive a paging frame and the paging occasion from the transmission identifier that are specific to a given group of communication devices 110. The embodiments further communicate a group paging at the paging frame and the paging occasion for the given group of communication devices 110. The group paging includes a scrambling value and a listening window duration. A Physical Downlink Control Channel (PDCCH) is scrambled by the scrambling value. The PDCCH communicates scheduling information that indicates when a Random Access Response (RAR) message is transmitted from the base station 105 to the communication device 110. The communication device instances 110 in the given group of communication devices 110 are monitoring for the RAR message and as a result are the only communication device instances 110 that respond with RRC connection request messages. As a result, RRC connection request messages from the communication device 110 to the base station 105 are established, reducing collisions between requests, and accelerating the random access procedure for all communication devices 110.

Figure 2A:
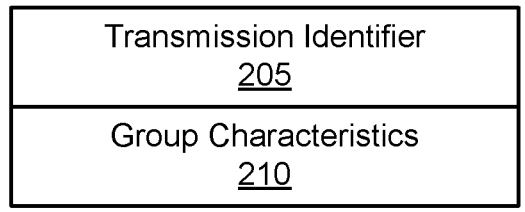
FIG. 2A is a schematic block diagram illustrating one embodiment of a connection release message.

FIG. 2A is a schematic block diagram illustrating one embodiment of a connection release message 200. The connection release message 200 may be organized as a data structure that is communicated between the base station 105 and the communication device 110. In one embodiment, the connection release message 200 is an RRC Connection Release. In the depicted embodiment, the connection release message 200 includes the transmission identifier 205. In addition, the connection release message 200 may include group characteristics 210. In one embodiment, the connection release message 200 is transmitted by the base station 105 over a Physical Downlink Shared Channel (PDSCH).

The transmission identifier 205 may distinguish groups of a plurality of communication device groups. The transmission identifier 205 may be an alphanumeric string. Alternatively, the transmission identifier 205 may be a numeric string. In one embodiment, the transmission identifier 205 is a binary string.

The transmission identifier 205 may have a specified length. In a certain embodiment, ranges of the transmission identifier 205 corresponds to different types of communication devices 110. For example, ranges of the transmission identifier 205 may correspond to one or more of types of communications including human-to-human communication devices 110, machine-type communications communication devices 110, low priority communications, high priority communications, and/or emergency communications. The communication device 110 may assign itself to a communication device group based on the type of communication the communication device 110 is initiating. In addition, the communication device 110 may derive the paging frame and the paging occasion from the transmission identifier 205 based on the communication device group.

Alternatively, the communication device 110 may determine the communication device group from a communication device identifier for the communication device 110 and the transmission identifier 205. In one embodiment, the communication device 110 may determine the communication device group as a function of the communication device identifier corresponding to the communication device group and the transmission identifier 205.

In a certain embodiment, the group characteristics 210 specify characteristics for one or more communication device groups encoded in the transmission identifier 205. For example, communication device 110 may employ the group characteristics 210 to determine that the communication device 110 is in a first communication device group. The group characteristics 210 may associate one or more of a communication device type, a communication device location, a communication device priority, and the like with a communication device group and/or a range of the transmission identifier 205.

Figure 2B:
FIG. 2B is a text diagram illustrating one embodiment of a transmission identifier.

FIG. 2B is a text diagram illustrating one embodiment of a transmission identifier 205. In the depicted embodiment, the transmission identifier 205 is a numeric string with a plurality of ranges 207a-e. In one embodiment, each range 207a-e is associated with a communication device group 209a-e. In the depicted embodiment, the communication device groups 209a-e are identified by the letters A-E, although the communication device groups 209a-e may employ any label. A range 207a-e may indicate a type of communication device that is assigned to a given communication device group 209a-e.

Figure 2C:
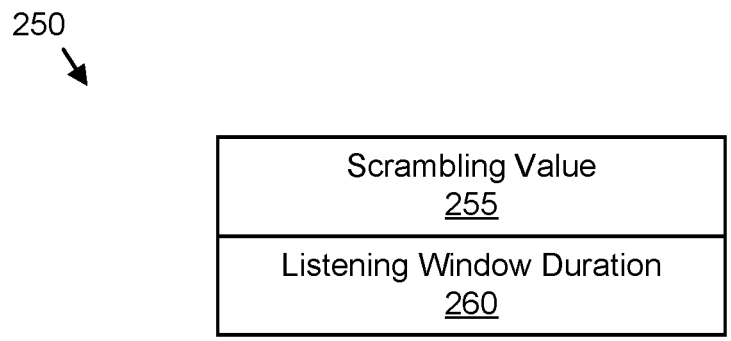
FIG. 2C is a schematic block diagram illustrating one embodiment of a group paging.

FIG. 2C is a schematic block diagram illustrating one embodiment of a group paging 250. The group paging 250 maybe organized as a data structure that is transmitted from the base station 105 to the communication device 110. In the depicted embodiment, the group paging 250 includes a scrambling value 255 and a listening window duration 260. The group paging 250 may be transmitted from the base station 105 over a PDSCH.

The scrambling value 255 may be used as a seed that is hashed to determine a PDCCH over which an RAR message is transmitted. Alternatively, the scrambling value 255 may be used to decode an RAR message that is received over PDCCH.

The listening window duration 260 indicates the time interval during which the base station 105 will transmit an RAR message and during which the communication device 110 should monitor for the RAR message. The listening window duration 260 may be measured in seconds, milliseconds, or the like.

Figure 2D:
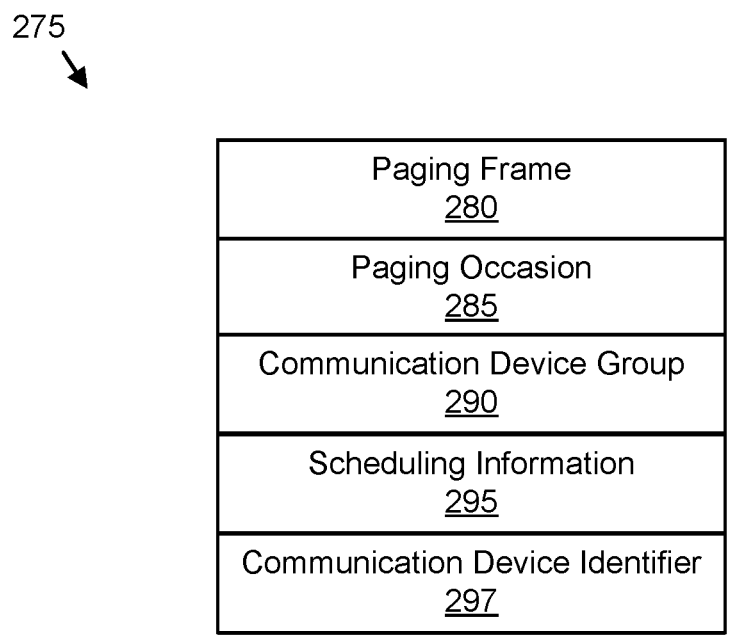
FIG. 2D is a schematic block diagram illustrating one embodiment of random access data.

FIG. 2D is a schematic block diagram illustrating one embodiment of random access data 275. The random access data 275 may be organized as a data structure in a memory. In the depicted embodiment, the random-access data 275 includes a paging frame 280, a paging occasion 285, a communication device group 290, scheduling information 295, and a communication device identifier 297.

The paging frame 280 may specify PDCCH frame in which the base station 105 transmits the group paging 250. The paging occasion 285 may specify a subframe of the PDCCH in which the base station 105 transmits the group paging 250.

In one embodiment, the communication device group 290 specifies a group that a communication device instance 110 is associated with a communication device instance 110, a communication device type, and/or the communication device identifier 297. The communication device group 290 may be predetermined for the communication device instance 110. Alternatively, a communication device instance 110 may determine the communication device group 290 from the group characteristics 210. In one embodiment, portions of the communication device identifier may be hashed to generate the communication device group 290.

The communication device identifier 297 may uniquely identify a communication device instance 110. In one embodiment, the communication device group 290 is determined from the communication device identifier 297. Alternatively, the communication device group 290 may be determined as a function of the communication device identifier 297 and the transmission identifier 205.

The scheduling information 295 may specify when the base station 105 transmits an RAR message to the communication device 110. The scheduling information 295 may be embodied in the PDCCH.

Figure 3:
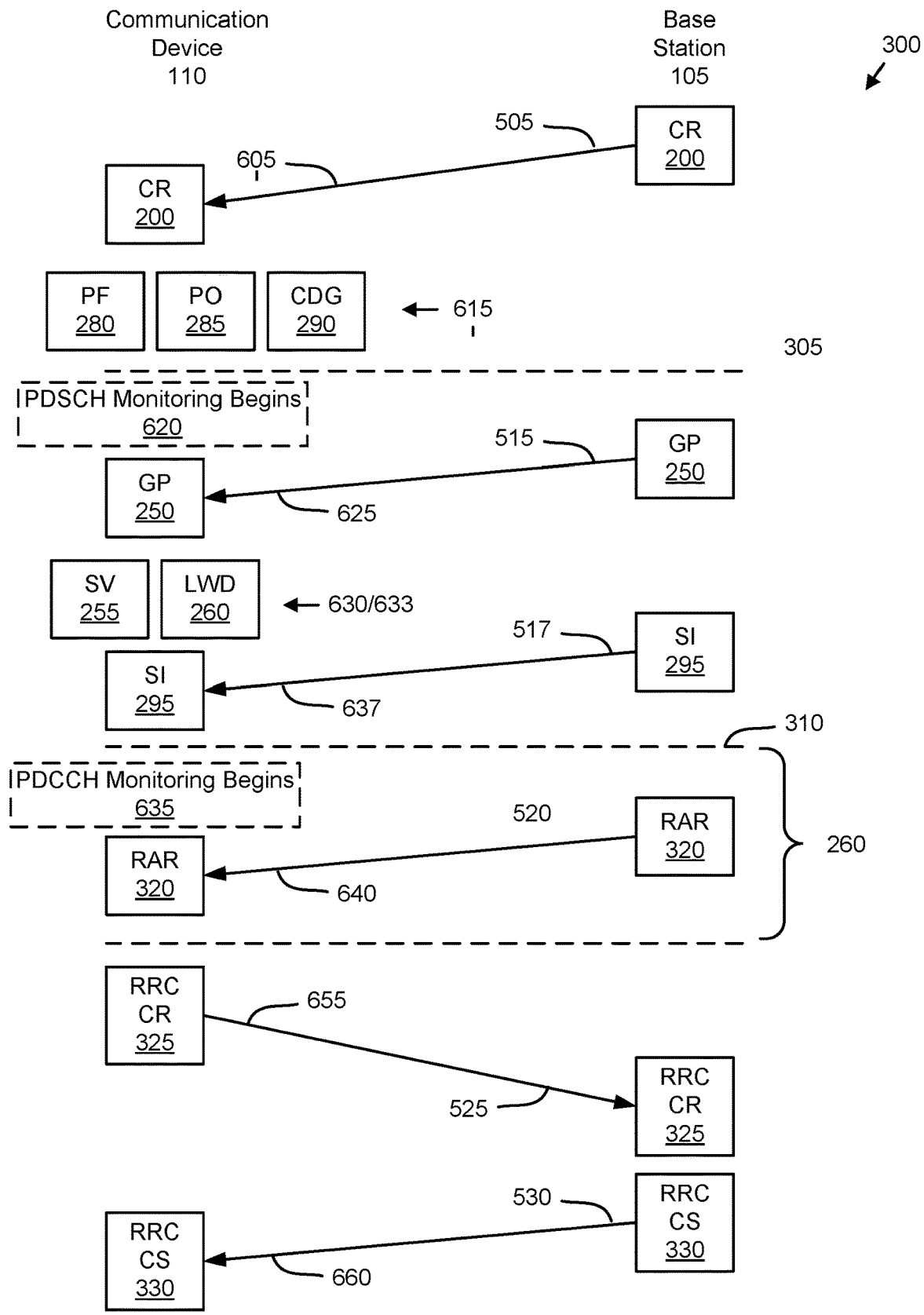
FIG. 3 is a schematic process diagram illustrating one embodiment of a random access procedure.

FIG. 3 is a schematic process diagram illustrating one embodiment of a random access procedure 300. The procedure 300 may support a plurality of communication device 110 establishing communications with the base station 105. In the depicted embodiment, the base station 105 transmits 505 a connection release message 200 to the communication device 110. The connection release message 200 may be transmitted 505 via the PDSCH. The communication device 110 may receive 605 the connection release message 200 and derive 615 the paging frame 280 and the paging occasion 285 from the connection release message 200 based on a communication device group 290 for the communication device 110.

The communication device 110 may monitor 620 the PDSCH in the paging frame 280 and the paging occasion 285 for the group paging 250 at time T1 305 in response to deriving 615 the paging frame 280 and the paging occasion 285. The base station 105 may transmit 515 the group paging 250 via the PDSCH at the paging frame 280 and the paging occasion 285. The communication device 110 may receive 625 the group paging 250 and determine 630 the scrambling value 255 and determine 633 the listening window duration 260 from the group paging 250.

The base station 105 may transmit 517 the scheduling information 295 via the PDCCH scrambled by the scrambling value 255. The communication device 110 may receive 637 the scheduling information 295 via the PDCCH using the scrambling value 255.

The communication device 110 may begin monitoring 635 the PDCCH at time T2 310 for an RAR message 320. The time T2 310 may be specified by the scheduling information 295. In one embodiment, the communication device 110 uses the scrambling value 255 to monitor 635 the PDCCH. The communication device 210 may monitor 635 the PDCCH for the listening window duration 260. The base station 105 may transmit 520 the RAR message 320 within the listening window duration 260. In addition, the communication device 110 may detect 640 the RAR message 320.

The communication device may transmit 655 an RRC connection request message 325 in response to receiving 640 the RAR message 320 from the base station 105. The base station 105 may receive 525 the RRC connection request message 325 and transmit 530 an RRC connection set up message 330 in response to receiving 525 the RRC connection request message 325 from the communication device 110. The communication device 110 may receive 660 the RRC connection set up message 330 and establish communications with the base station 105 using the RRC connection set up message 330.

Figure 4:
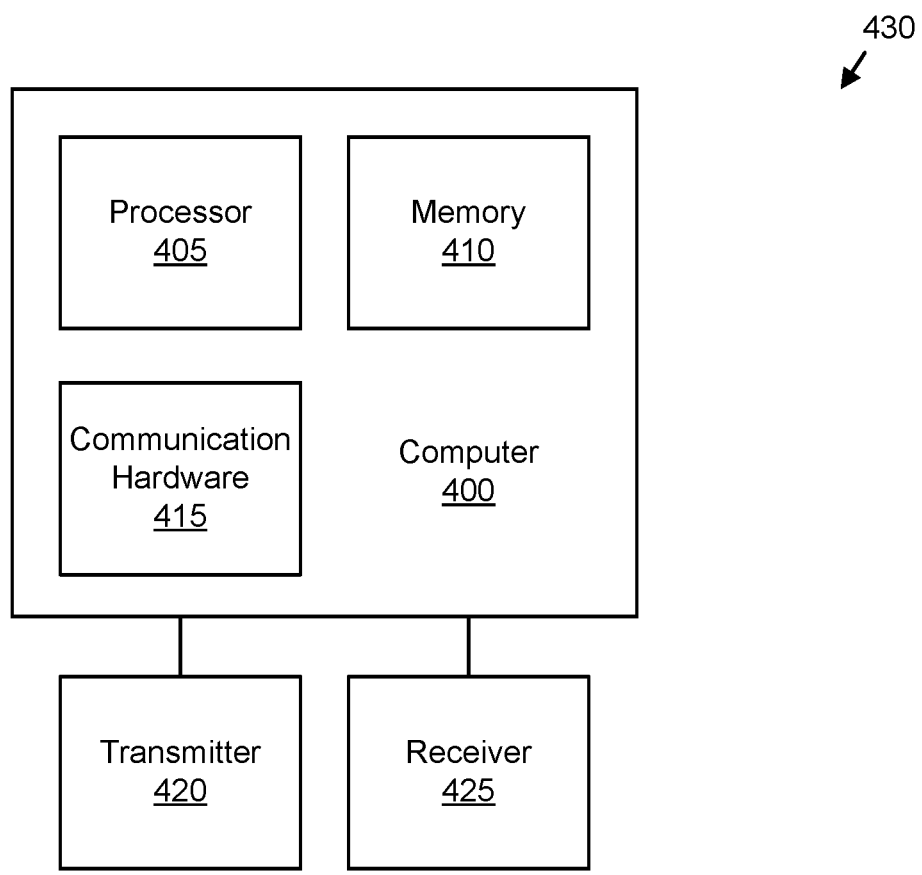
FIG. 4 is a schematic block diagram illustrating one embodiment of a transceiver.

FIG. 4 is a schematic block diagram illustrating one embodiment of a transceiver 430. The base station 105 and the communication device 110 may each embody an instance of the transceiver 430. In the depicted embodiment, the transceiver 430 includes a computer 400, transmitter 420, and a receiver 425. The computer 400 includes a processor 405, a memory 410, and communication hardware 415. The memory 410 may include a semiconductor storage device, hard disk drive, an optical storage device, micromechanical storage device, or combinations thereof. The memory 410 may store code. The processor 405 may execute the code. The communication hardware 415 may receive messages through the receiver 425 and transmit messages through the transmitter 420.

Figure 5A:
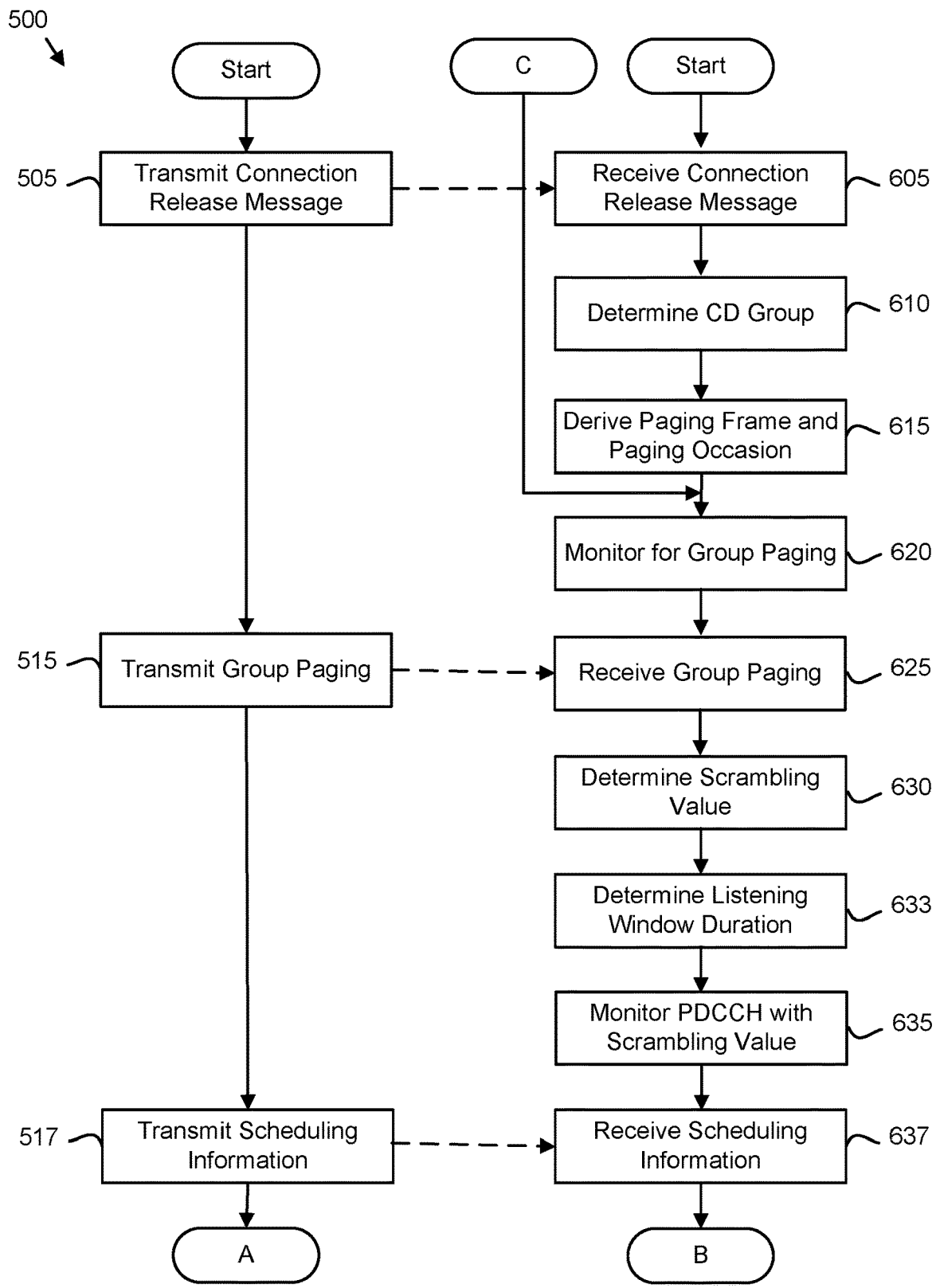
FIGS. 5A-B are schematic flow chart diagrams illustrating one embodiment of a random access method.
Figure 5B:
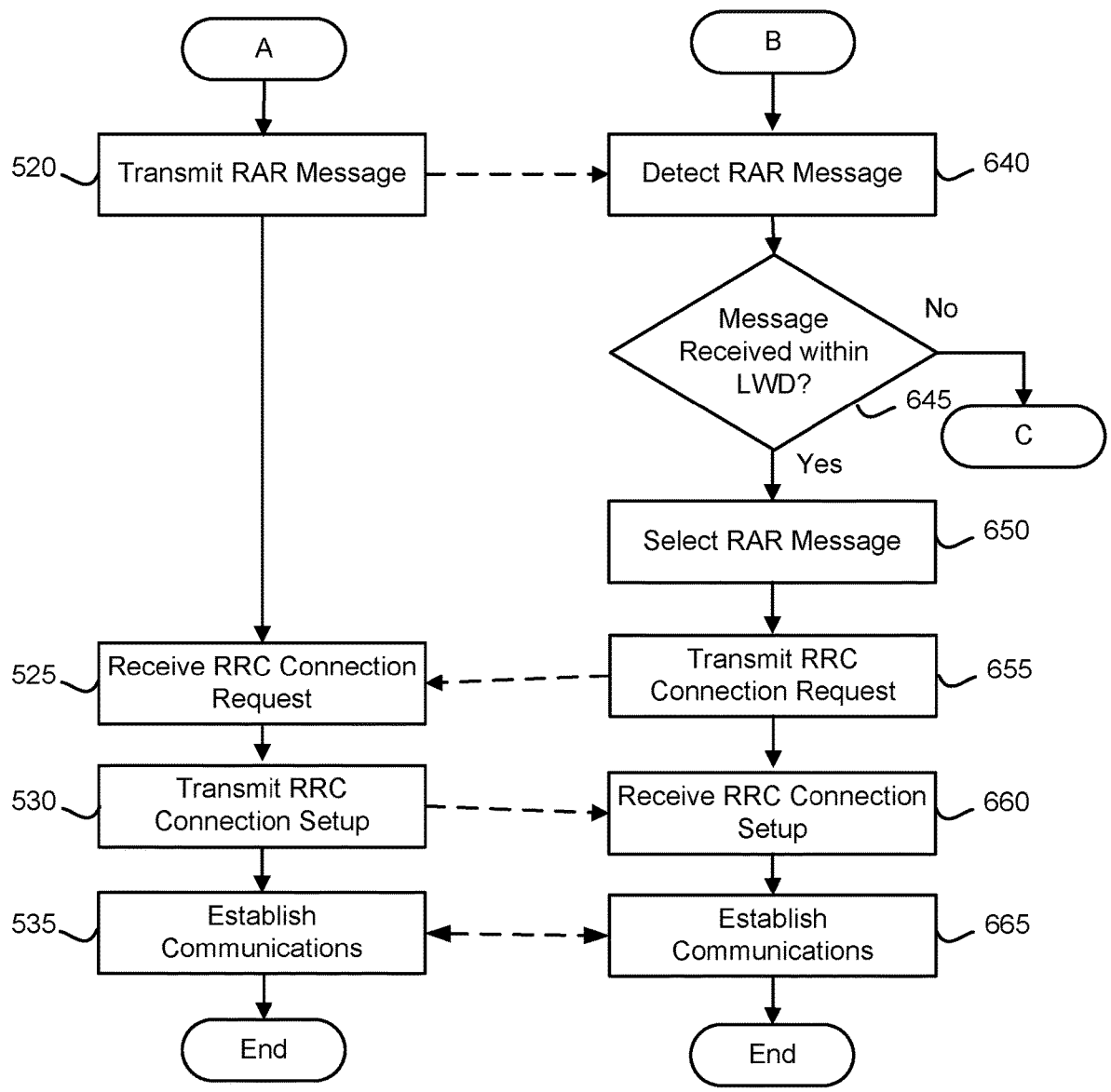

FIGS. 5A-B are schematic flow chart diagrams illustrating one embodiment of a random access method 500. The method 500 may employ the random access procedure 300 to establish communications between a plurality of communication devices 110 and the base station 105. The method 500 may be performed by the base station 105 and the communication device 110 singly or in mutual cooperation.

The method 500 starts, and in one embodiment, the base station 105 transmits 505 the connection release message 200. The method 500 further starts and the communication device 110 receives 605 the connection release message 200. A plurality of communication devices 110 may receive 605 the connection release message 200. For simplicity, the random-access method 500 is described for a single communication device instance 110. However, the random-access method 500 may concurrently establish communications between a plurality of communication devices 110 and the base station 105.

The communication device 110 may determine 610 the communication device group 290 from the transmission identifier 205 in the connection release message 200. In one embodiment, the communication device 110 may determine 610 the communication device group 290 from a range 207 of the transmission identifier 205. The communication device 110 may select the range 207 based on the communication device identifier 297. The range 207 may specify the communication device group 290 for the communication device 110.

Alternatively, the communication device 110 may determine 610 the communication device group 290 as a function of the communication device identifier 297 and the transmission identifier 205 and/or a range 207 of the transmission identifier 205. For example, the communication device group 290 may be determined 610 as a first range 207a of the transmission identifier 205 concatenated with a last alphanumeric character of the communication device identifier 297.

In one embodiment, the communication device group 290 may be determined 610 as a function of the communication device identifier 297. For example, the communication device group 290 may be a hash of the communication device identifier 297.

The communication device 110 may further derive 615 the paging frame 280 and the paging occasion 285 from the transmission identifier 205 embodied in the connection release message 200 received from the base station 105. Each communication device group 290 may be associated with a given paging frame 280 and a given paging occasion 285. In one embodiment, the paging frame 280 and the paging occasion 285 are parsed from one or more ranges 207 of the transmission identifier 205.

The communication device 110 may monitor 620 for the group paging 250 in the paging frame 280 and the paging occasion 285. The base station 105 may transmit 515 the group paging 250 at the paging frame 280 and the paging occasion 285 and the communication device 110 may receive 625 the group paging 250.

The communication device 110 may determine 630 the scrambling value 255 and determine 633 the listening window duration 260 from the group paging 250. In addition, the communication device 110 may monitor 635 the PDCCH with the scrambling value 255. The base station 105 may transmit 517 the scheduling information 295 via the PDCCH using the scrambling value 255. The communication device 110 may receive 637 the scheduling information 295 via the PDCCH using the scrambling value 255.

The base station 105 may transmit 520 one or more RAR messages 320. The base station 105 may transmit 520 a plurality of RAR messages 320 for each communication device group 290 of a plurality of communication device groups 290. The transmission 520 of the one or more RAR messages 320 may be according to the scheduling information 295. The communication device 110 may detect 640 the one or more RAR messages 320. The communication device 110 may monitor for and detect 640 the one or more RAR messages 320 according to the scheduling information 295.

If the communication device 110 determines 645 that a RAR message 320 is not detected within the listening window duration 260, the communication device 110 may monitor 620 for the group paging 250 in the next paging frame 280 and paging occasion 285. If the communication device 110 determines 645 that the one or more RAR messages 320 are detected, the communication device 110 may select 650 one RAR message 320. The communication device 110 may further transmit 655 an RRC connection request 325 in response to the selected RAR message 320. In one embodiment, the RRC connection request 325 includes the communication device identifier 297.

The base station 105 may receive 525 the RRC connection request 325 and transmit 530 an RRC connection set up 330 in response to receiving 525 the RRC connection request 325. The RRC connection set up 330 may include the communication device identifier 297. The communication device 110 may receive 660 the RRC connection set up 330 and establish 665 communications with the base station 105 using the RRC connection set up 330 and the method 500 ends. The base station 105 may establish 535 communications with the communication device 110 and the method 500 ends.

The embodiments employ the transmission identifier 205 and the group paging 250 to organize the plurality of communication devices 110 into one or more communication device groups 290. A communication device instance 110 monitors a given paging frame 280 and a given paging occasion 285 according to the communication device group 290 of the communication device instance 110. The communication device instance 110 further receives the scrambling value 255 and the listening window duration 260 and employs the scrambling value 255 to receive the scheduling information 295 via the PDCCH. The communication device instance 110 then monitors for the RAR message 320 based on the scheduling information 295 for the listening window duration 260. As a result, the base station 105 may target RAR messages 320 to specific communication device groups 290. Only the communication device instances 110 within a targeted communication device group 290 will respond to the RAR messages 320 with RRC connection request messages 325 to establish communications with the base station 105. As a result, the collisions of RRC connection request messages 325 are established, speeding the establishment of communications between the base station 105 and the communication device 110.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

The invention claimed is:

1. A method comprising:
transmitting a connection release message to a communication device, wherein the connection release message comprises a transmission identifier that indicates emergency communications and derives a paging frame and a paging occasion for the communication device and the connection release message is associated with group characteristics comprising at least one of a communication device type and a communication device priority with a communication device group;
transmitting a group paging in the paging frame and the paging occasion, wherein the group paging comprises a scrambling value and a listening window duration, wherein the scrambling value is hashed to determine a Physical Downlink Control Channel (PDCCH) over which scheduling information is transmitted;
scrambling the PDCCH over which the scheduling information is transmitted with the scrambling value;
transmitting scheduling information via the scrambled PDCCH identified by the hash of the scrambling value;
transmitting a Random Access Response (RAR) message for the communication device during the listening window duration in response to transmitting the scheduling information, wherein the RAR message is scheduled according to the scheduling information in the PDCCH;
transmitting a Radio Resource Control (RRC) connection set-up message in response to receiving a RRC connection request message from the communication device;
receiving a RRC connection request; and
organizing the communication device group with the transmission identifier.

2. The method of claim 1, wherein the transmission identifier distinguishes a plurality of communication device groups.

3. The method of claim 2, wherein each communication device group of the plurality of communication device groups is associated with a given paging frame and a given paging occasion.

4. The method of claim 2, wherein a plurality of RAR messages are transmitted for each communication device group of the plurality of communication device groups.

5. A method comprising:
deriving a paging frame and a paging occasion from a transmission identifier embodied in a connection release message received from a base station, wherein the transmission identifier indicates emergency communications and the connection release message is associated with group characteristics comprising at least one of a communication device type and a communication device priority with a communication device group;
monitoring for a group paging from the base station in the paging frame and the paging occasion;
determining a scrambling value from the group paging, wherein the group paging comprises the scrambling value and a listening window duration, the scrambling value is hashed to determine a Physical Downlink Control Channel (PDCCH) over which scheduling information is transmitted;
monitoring the scrambled PDCCH with the hash of the scrambling value;
detecting a Random Access Response (RAR) message during the listening window duration, wherein the RAR message is scheduled according to the scheduling information in the PDCCH;
receiving a Radio Resource Control (RRC) connection set-up message; and
transmitting a RRC connection request in response to the RAR message from the base station.

6. The method of claim 5, the method further comprising:
establishing communications with the base station in response to the RRC connection set-up message.

7. An apparatus comprising:
a transmitter that transmits a connection release message to communication device, wherein the connection release message comprises a transmission identifier that indicates emergency communications and derives a paging frame and a paging occasion for the communication device and the connection release message is associated with group characteristics comprising at least one of a communication device type and a communication device priority with a communication device group;
the transmitter transmits a group paging in the paging frame and the paging occasion, wherein the group paging comprises a scrambling value and a listening window duration, wherein the scrambling value is hashed to determine a Physical Downlink Control Channel (PDCCH) over which scheduling information is transmitted;
the transmitter scrambles the PDCCH over which the scheduling information is transmitted with the scrambling value;
the transmitter transmits scheduling information via the scrambled PDCCH identified by hash of the scrambling value;
the transmitter transmits a Random Access Response (RAR) message for the communication device during the listening window duration in response to transmitting the scheduling information, wherein the RAR message is scheduled according to the scheduling information in the PDCCH;
the transmitter transmits a Radio Resource Control (RRC) connection set-up message in response to receiving a RRC connection request message from the communication device;
the transmitter receives a RRC connection request; and
the transmitter organizes the communication device group with the transmission identifier.

8. The apparatus of claim 7, wherein the transmission identifier distinguishes a plurality of communication device groups.

9. The apparatus of claim 8, wherein each communication device group of the plurality of communication device groups is associated with a given paging frame and a given paging occasion.

10. The apparatus of claim 8, wherein a plurality of RAR messages are transmitted for each communication device group of the plurality of communication device groups.

11. An apparatus comprising:
a receiver that derives a paging frame and a paging occasion from a transmission identifier embodied in a connection release message received from a base station, wherein the transmission identifier indicates emergency communications and the connection release message is associated with group characteristics comprising at least one of a communication device type and a communication device priority with a communication device group;
the receiver monitors for a group paging from the base station in the paging frame and the paging occasion;
the receiver determines a scrambling value from the group paging, wherein the group paging comprises the scrambling value and a listening window duration, the scrambling value is hashed to determine a Physical Downlink Control Channel (PDCCH) over which scheduling information is transmitted;
the receiver monitors the PDCCH scrambled with the hash of the scrambling value;
the receiver detects a Random Access Response (RAR) message during the listening window duration, wherein the RAR message is scheduled according to the scheduling information in the PDCCH;
the receiver receives a Radio Resource Control (RRC) connection set-up message; and
the receiver transmits a RRC connection request in response to the RAR message from the base station.

12. The apparatus of claim 11, wherein the receiver further:
establishes communications with the base station in response to the RRC connection set-up message.

* * * * *